United States Patent
Domínguez Abascal et al.

(10) Patent No.: US 9,212,831 B2
(45) Date of Patent: Dec. 15, 2015

(54) SUPPORT MODULE FOR A SOLAR COLLECTOR HAVING A TRIANGULAR SUBSTRUCTURE

(75) Inventors: José Domínguez Abascal, Sevilla (ES); Fernando Medida Encina, Sevilla (ES); Fernando Medida Reguera, Sevilla (ES); Maximiliano Carrasco Gimena, Sevilla (ES); José Parra Fernández-Mota, Sevilla (ES); Luis Garrido Delgado, Sevilla (ES)

(73) Assignee: Europea De Construcciones Metalicas, S.A., Sevilla (ES)

( * ) Notice: Subject to any disclaimer, the term of this patent is extended or adjusted under 35 U.S.C. 154(b) by 368 days.

(21) Appl. No.: 13/977,673

(22) PCT Filed: Dec. 29, 2011

(86) PCT No.: PCT/ES2011/000382
§ 371 (c)(1),
(2), (4) Date: Sep. 18, 2013

(87) PCT Pub. No.: WO2012/089870
PCT Pub. Date: Jul. 5, 2012

(65) Prior Publication Data
US 2014/0020677 A1  Jan. 23, 2014

(30) Foreign Application Priority Data
Dec. 30, 2010 (ES) .................................. 201001653

(51) Int. Cl.
*F24J 2/52* (2006.01)
*F24J 2/10* (2006.01)

(52) U.S. Cl.
CPC ............... *F24J 2/5232* (2013.01); *F24J 2/526* (2013.01); *F24J 2/5233* (2013.01); *F24J 2002/1023* (2013.01); *Y02E 10/47* (2013.01)

(58) Field of Classification Search
CPC ......... F24J 2/5232; F24J 2/5233; F24J 2/526; F24J 2/14
USPC ............. 126/696, 606, 640; 136/246; 52/633, 52/645, 655.1
See application file for complete search history.

(56) References Cited

U.S. PATENT DOCUMENTS 4,558,551 A * 12/1985 Sevelinge et al. ............... 52/646
4,829,739 A *  5/1989 Coppa .......................... 52/745.2
(Continued)

FOREIGN PATENT DOCUMENTS

| WO | 2010120349 A1 | 10/2010 |
| WO | 2011011728 A1 | 1/2011 |
| WO | 2011070180 A1 | 6/2011 |

OTHER PUBLICATIONS

ISR for PCT/ES2011/000382, mailed on Apr. 24, 2012.
(Continued)

*Primary Examiner* — Gregory Huson
*Assistant Examiner* — Nikhil Mashruwala
(74) *Attorney, Agent, or Firm* — Ladas & Parry, LLP

(57) ABSTRACT

The invention relates to a support module for a solar collector having a triangular substructure, formed by: a main structure intended to resist the torsional and bending forces of the collector, and an auxiliary structure that balances the assembly and supports the weight of the mirrors and the absorber tube. The main structure includes: a triangular substructure comprising rectangular pyramids and two half-pyramids at the ends, bars (5) joining the upper vertex of each pyramid (1) to the upper vertex (1) of the adjacent pyramid or to the upper vertex (1') of the adjacent half-pyramid (1'), a diagonal bar (4) joining two opposite vertices of the base of each pyramid, and two king posts (6) located on each end of the triangular substructure. The auxiliary structure includes: arms (7, 7'), struts (8, 8', 8") for each arm (7, 7'), purlins (9) and supports (11) for the absorber tube (12).

10 Claims, 5 Drawing Sheets

(56) References Cited

U.S. PATENT DOCUMENTS

| | | | |
|---|---|---|---|
| 8,615,960 B2 * | 12/2013 | Marcotte et al. | 52/655.1 |
| 2008/0204352 A1 * | 8/2008 | Reynolds et al. | 343/880 |
| 2010/0050560 A1 | 3/2010 | Werner et al. | |
| 2010/0058703 A1 * | 3/2010 | Werner et al. | 52/645 |
| 2010/0213336 A1 * | 8/2010 | Del Pico Aznar et al. | 248/316.8 |
| 2013/0220950 A1 * | 8/2013 | Gilabert | 211/13.1 |

OTHER PUBLICATIONS

International Preliminary Report on Patentability (Ch. II) with English-language translation, completed on Dec. 10, 2012.

* cited by examiner

SUPPORT MODULE FOR A SOLAR COLLECTOR HAVING A TRIANGULAR SUBSTRUCTURE

CROSS-REFERENCE TO RELATED APPLICATIONS

This application is the U.S. National Phase of International Patent Application No. PCT/ES2011/000382, filed on Dec. 29, 2011, which claims priority to Spanish Patent Application No. P201001653 filed on Dec. 30, 2010, the disclosures of which are hereby incorporated by reference in their entireties.

TECHNICAL FIELD OF THE INVENTION

The invention falls within the field of support structures for solar collectors, more specifically it relates to the modules or frames, used for fastening mirrors or reflectors and the receiver and absorber tubes.

These modules must support all the loads and forces, both of the collector itself, as well as of the external agents to which they are subjected.

BACKGROUND OF THE INVENTION

Electric power production plants based on solar radiation can use diverse types of solar collectors (cylindrical-parabolic collector, Stirling dish, central towers with heliostats, Fresnel collectors, etc.) and all of them require support modules for the mirrors or reflectors that are responsible for concentrating solar radiation.

Generally, the collectors have a supplementary device known as a solar tracker, which allows them to orient themselves towards the sun, resulting in high performances.

The invention claimed herein refers to the support module for a solar collector, the solar tracker, which can be attached later not being an object of the invention.

Many of the inventions of the state of the art describe lattice modules that support collectors of the cylindrical-parabolic type. Cylindrical-parabolic collectors for collecting the sun's energy, use cylindrical-parabolic shaped mirrors. An absorber pipe or tube, through which a heat transfer fluid circulates, passes through the focus of the parabola, where the fluid is heated upon receiving the concentrated sun rays. Once the fluid is heated, which reaches temperatures close to 400° C., if said fluid is steam, it is sent directly to a turbine to produce electricity or, if it is another type of heat transfer fluid, which is not in vapor phase at said temperature, then it is sent to a heat exchanger for the production thereof.

Regarding its geometry, a single collector of the cylindrical-parabolic type is formed by a plurality of modules. Each one of these modules comprises a support structure, a cylindrical-parabolic reflector and an absorber tube.

All the support modules are formed by two types of elements. The first type comprises a set of elements called structural members or main structure, responsible for making the assembly rigid and withstanding the torsional and bending forces, which the whole collector assembly is subjected to. The second type comprises all those elements called supplementary elements or auxiliary structures, responsible for simply balancing the assembly and supporting the weight of the mirrors (reflector) or of the absorber tube.

Within the structural elements are the chords, posts, arms and the connections between them. The chords are the bars or elements that run longitudinally through the entire module. The arms are transversal to the chords and provide the necessary curvature for the cylindrical-parabolic reflector. The posts are located in vertical position (with greater or lesser inclination) and are connected to the chords at the nodes or connections. Furthermore, there may be secondary structural elements depending on how the module design is conceived. For example, bracing bars may be added, limiting the buckling length of the main elements.

The purlins and supports of the absorber tube are included among the supplementary elements. The purlins are installed on the arms and hold the mirrors. The supports of the absorber tube are elevated vertically over the focus of the parabola and support the tube at the exact height for the correct concentration of the solar rays that the mirrors reflect, on to the heat transfer fluid that runs through the tube.

There is a vast amount of state of the art relating to the support structures of solar collector modules, such as U.S. Pat. No. 6,414,237, U.S. Pat. No. 5,069,540, ES2326303, ES2161589, CA1088828, EP0082068, U1070880 among others.

Specifically, the patent WO2008039233A2 "Space frames and connection node arrangement" by GOSSAMER SPACE FRAMES describes a movable armature for a curved reflector of those known as double-layered, so called for having two surfaces, parallel or not, but placed at different heights.

In this structure, among the structural elements, are the following:

the bottom layer formed by two bottom major chords (51, 52), parallel one another, and parallel to the curvature axis of the reflector, the length of which being equal to the total length of the module;

the top layer of the structure formed by three upper chords, one central (57) and two outer (58, 59) the central chord being on a different plane to that of the outer chords, to configure the required curvature of the reflector;

minor chords of the bottom layer (53) and minor chords of the upper layer (61) which are placed transversally to the major chords;

struts (62) that diagonally connect the upper major chords (57, 58, 59) with the bottom major chords (51, 52);

node connectors that connect each major chord (51, 52, 57, 58, 59) with the minor chords (53) and the struts (62), torsion braces (92) diagonally connecting the chords (58) and (59) with the chord (57), as well as diagonally connecting the major chords (51, 52) of the bottom layer;

diagonal members or struts (60) that connect the major chords (51, 52) of the bottom plane with the central major chord of the upper plane (57).

Among the supplementary elements, the invention describes:

some reflector mounting members (99) on the minor chords, which define a curved surface that follows the curvature of the reflector;

some extended reflector support outriggers or members (100) that protrude out of the upper outer chords (58, 59) and involve an elongation, with a different angle, of the minor chord of the upper layer (61).

absorber tube supports (90) that require bars (95, 96) to stabilize said support and connect it to the base.

In view of the state of the art, the invention claimed herein is intended to provide a module that serves as a support for a solar collector of cylinder-parabolic type and that, even despite being formed by a reticular structure of nodes and bars, has a series of characteristics that make it substantially different from those known in the state of the art, providing significant advantages both of structural strength and cost reduction in transport and assembly, all thanks to the simplification of the elements known as structural elements, i.e. those that support the loads and forces of the assembly of the collector.

DESCRIPTION OF THE INVENTION

The invention describes a support module for a cylinder-parabolic solar collector of those that do not have a double surface or double layer, but rather one lower surface and one upper line, which together form a triangular-section torsion beam (or torque box).

This torsion beam is intended to resist the torsional and bending stresses due to the weight and the wind on the reflectors and which are transmitted from one module to another along the collector, since each collector can be formed by a plurality of modules.

The invention focuses on developing a structure, which, unlike the known state of the art, has a number of essential characteristics that provide it with significant advantages as compared to what can be found in the field.

As mentioned above, the support modules are formed by:

Main structure: this is the name given to the set of structural elements intended to support the stresses and forces of the solar collector, as well as providing it with the necessary rigidity.

Supplementary elements or auxiliary structure: the purpose of which is to balance the assembly and support only the weight of the mirrors or reflector and of the absorber tube or receiver, as well as to transmit said weight to the triangular structure. The induced torsion from one module to another due to the wind and weight loads is not conducted through the supplementary elements therefore these elements do not increase the load along the collector, unlike the main structure.

In the case of the claimed invention, the main structure includes the following elements:

1. Triangular substructure or triangular prism: having the same length as the module, it is responsible for transmitting the torsion along the module. This torsion is a result of the wind loads and its own weight and is transmitted from one module to another, increasing along the collector (as mentioned earlier, each collector can be formed by a plurality of modules.) The triangular substructure is formed by:
   One single row of regular pyramids with a rectangular base, located one next to the other,
   two tetrahedrons or half-pyramids located one at each end of the triangular substructure completing along with it, the total length of the module,
   individual bars joining the upper vertex of each pyramid to the matching upper vertex of the adjacent pyramid or half-pyramid,
   a diagonal bar joining two opposite vertices of the base of the pyramid.
   Among the bars that form the pyramids, one of them is called the bracing edge and is considered a secondary structural element. This is the edge located at the base of the pyramids that adjacent pyramids have in common. This bar only acts as a bracing element, limiting the buckling length.
2. Two king posts: vertical pieces that have good rigidity and bending characteristics and are located one on each end of the triangular substructure. They are responsible for transmitting the torsion coming from the adjacent module, to the triangular substructure of the module to which they belong. Connected to them are the following:
   The diagonal edges of the two tetrahedrons or half-pyramids of the triangular substructure,
   The edges of the triangular base of the half-pyramid,
   The individual bars joining the upper vertices of the pyramids located on the ends to those of the half-pyramids,
   The central axis, on one of the two ends, which coincides with the center of gravity of the structure including the reflector and the absorber tube.

With regard to the supplementary elements or auxiliary structure comprised into the structure, the following are included:

1. Arms: they are connected to the triangular substructure and have the following characteristics:
   The arms are formed by a rectangular-section bent tube or by a rectangular-section curved tube, so it can be adapted to the curvature of the parabola of the reflector, so it can be adapted to the curvature of the parabola of the reflector,
   There are inner arms starting from the upper vertices of the pyramids and two outer arms starting from the upper vertices of the half-pyramids by means of plates associated to the king posts.
2. Struts or elements supporting the arms: they only support the proportional load of the reflector they have on top of them. The plane formed by the struts cannot transmit the torsion along the module it only supports the arms. There are three alternative embodiments for the design and placement of these struts:
   a) Embodiment 1: comprises two variants, one with a V arrangement (known as V1) and another with a Y arrangement (Known as Y1).
      V1: two struts consisting of two inclined bars, connecting the lower vertex of the corresponding pyramid with the ends of the two adjacent arms. The assembly of these two struts, which are connected on one same vertex, simulate a "V" shape. All the lower vertices have struts.
      Y1: A bar connected at the end of each arms and which joins, at the midpoint between the arms and at an intermediate height, with the bar that comes out of the end of the adjacent arm; a single bar that comes out already from the connection point between both bars, joins them to the vertex of the base of the corresponding pyramid. The assembly of the three bars simulates a "Y" shape. All the lower vertices have Y-shaped struts.
   b) Embodiment 2: also consists of two sub-variants, one V-shaped and another Y-shaped.
      V2: The same as in V1 but rather than providing with "V" shaped-struts all the lower vertices, providing the alternate vertices instead, maintaining also provided those located on the ends of the module.
      Y2: The same as Y1 but rather than providing with "Y" shaped struts all the lower vertices, providing the alternate vertices instead, maintaining also provided those located on the ends of the module.
   c) Embodiment 3: there are two struts for the two end arms (the outer arms). One strut spans from the lower end of the king post to the end of the arm; the other extends in parallel and is attached slightly higher to the king post and to the bending point of the arm. In the case of the inner arms, there are also two struts starting from the lower vertex, which is the node connecting the half-pyramid and the first pyramid, the first strut spanning from the vertex to the upper end of the arm and the other strut spanning from the same vertex to the bending point of the arm.

3. Purlins: bars with equal length to the length of the module, which rest directly on the arms by means of small pieces made of folded sheets (staples). The reflector is assembled on the purlins, also by means of staples.
4. Absorber tube supports: vertical structures that are attached on to each one of the vertices of the pyramids and on to one of the two king posts. The characteristics that said supports have are:

Freedom of rotation in the longitudinal direction of the collector, with a free margin along the three-axis for a better adjustment during the assembly.

Transversal bending rigidity.

Minimum opacity structure to avoid producing shadows on the surface of the reflector.

An essential characteristic of the support module of the solar collector of the invention, which distinguishes it from the existing state of the art, is that there is no triangulation between the arms and the triangular substructure, i.e., there is no supplementary bar connecting the arms to the triangular substructure, in such a way that the torsional forces can only be transmitted along the planes of the triangular substructure, the arms becoming supplementary elements that serve to support the reflectors but cannot contribute to the transmission of the main torsional forces.

The purlins, which are simply resting on the arms, do not act as longitudinal chords capable of providing torsional rigidity to the assembly, but rather as simple supports for the reflector.

This torsional rigidity characteristic is left to the bars connecting the upper vertices of the pyramids, to the bars forming the pyramids and half-pyramids and to the diagonal bar that joins the two opposite vertices of the base. This last bar is the bar that supports the greater forces and therefore it has a greater diameter than the others.

The structural profiles applied in this design will be the following:

Circular or square section tubes in all the elements that form the triangular substructure and the individual bars connecting the vertices of the pyramids and half-pyramids, as they are responsible for supporting the loads, with the exception of the bracing edge of the base, that the adjacent pyramids have in common, the main function of this bar is to limit the buckling length of the lower chords, since the loads that it supports are very low.

Rectangular section or open C-shaped section tubes in the arms.

Profiles with open C-shaped section, or omega W section or equivalent for the purlins and the struts or supports at the ends of the arms and the bracing edge.

The material used, in a preferred embodiment, for all the structural elements will be hot galvanized steel, grades S275JR or S355J0 or equivalents (in accordance with the UNE-EN 10025 standard).

These essential characteristics of the new structure effectively and economically solve the problems existing up until now, regarding the bending and torsional stresses, transport and assembly of the structure, since it greatly simplifies the number of elements, differentiating itself from what exists in the state of the art because:

The double layer is not necessary: it does not require an upper surface to withstand forces, since the loads are transmitted throughout the three planes of the triangular substructure that the lower chords and the upper chord define. In the state of the art, there are arrangements of five longitudinal chords that form seven triangular planes for transmitting forces.

The chords that are used in the state of the art, which have a length equal to the length of the module, which implies transport and assembly difficulties, are not longer necessary. In the case of the invention, the chords are pieces, whose the length does not coincide with the length of the module, but rather, are much shorter pieces that join the vertex of each pyramid with the vertex of the adjacent pyramid;

Also, the posts that withstand forces are not longer needed, only struts are used for balancing the end of the arms, which in addition, can be much lighter as they only support the proportional load of the reflector;

In the claimed invention, there is no triangulation between the arms and the triangular substructure, i.e., there is no supplementary bar connecting the arms to the triangular substructure, in a way that the torsional forces only have the possibility of being transmitted along the planes of the triangular substructure, the arms becoming supplementary elements supporting the load of the reflectors but that do not transmit the torsion along the module, since the plane that joins them is not triangulated, as is the case in the state of the art;

The supports of the absorber tube rest directly on the upper vertices of the pyramids, not requiring any supplementary connecting element transmitting the loads to the central chord;

The end king posts of each module are manufactured with standardized profiles, which provide them with a high flexural rigidity, while in the state of the art, the king posts used are manufactured in sheets, with a much lower structural resistance;

The arms of the invention become supplementary elements and are formed by a curved or bent rectangular tube, not requiring any additional element, or any intermediate connection to form the curvature that the reflector requires.

DESCRIPTION OF THE DRAWINGS

In order to complete the description being made, and with the purpose of aiding a better comprehension of the invention, a set of drawings representing the following in an illustrative rather than limitative manner is attached.

The references in the figures represent the following.

Figure 1:
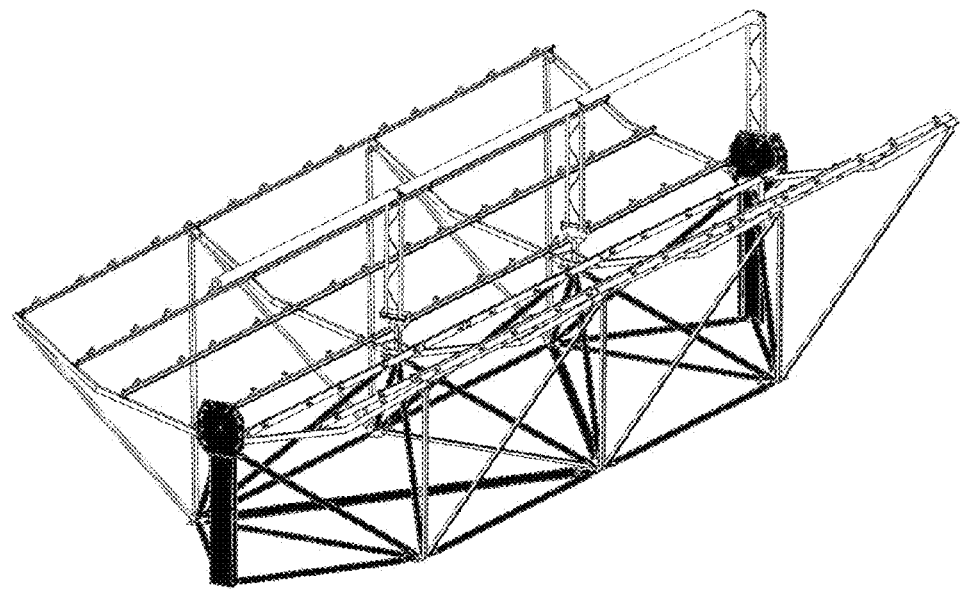
FIG. 1: Complete "V1" module distinguishing structural and supplementary elements

1. Upper vertex of the pyramid
1'. Upper vertex of the half-pyramid
2. Diagonal edges of the pyramid
2'. Diagonal edges of the half-pyramid
3. Edge of the rectangular base of the pyramid
3'. Edge of the triangular base of the half-pyramid
4. Diagonal bar of the base of the pyramid
5. Individual bars joining the upper vertices of the pyramids and the adjoining half-pyramids
6. King post
7. Outer arms
7'. Inner arms 8. Struts or supports of the arms in "V" configuration
8'. Struts or supports of the arms in "Y" configuration
8". Struts or supports of the arms according to embodiment 3
9. Purlins
10. Staples
11. Absorber tube support
12. Absorber tube
13. Strengthening edge

PREFERRED EMBODIMENT OF THE INVENTION

In order to achieve greater understanding of the invention, the module of the solar collector according to a preferred embodiment will be described below.

In FIG. 1 a preferred embodiment of the complete module of the invention can be observed, wherein it is shown which elements of the same form the main substructure (thick black lines) and which are supplementary elements (thinner lines).

In a preferred embodiment such as that shown in the figures, the module has a total length of 12 m. To support the torsional and bending moments, as well as the weight of the mirrors and the absorber tube, such as elements of the main structure, the following is required: two rectangular base pyramids 4×3 m, two half-pyramids at the ends, three bars connecting the upper vertices of the pyramids and half-pyramids and two king posts at the ends. With regard to the supplementary elements, it comprises: two outer arms and two inner arms, the supports of the arms in any of their two configurations, eight purlins with their staples for holding the mirrors and three supports of the absorber tube resting on one king post and on the upper vertices of the pyramids.

Figure 2:
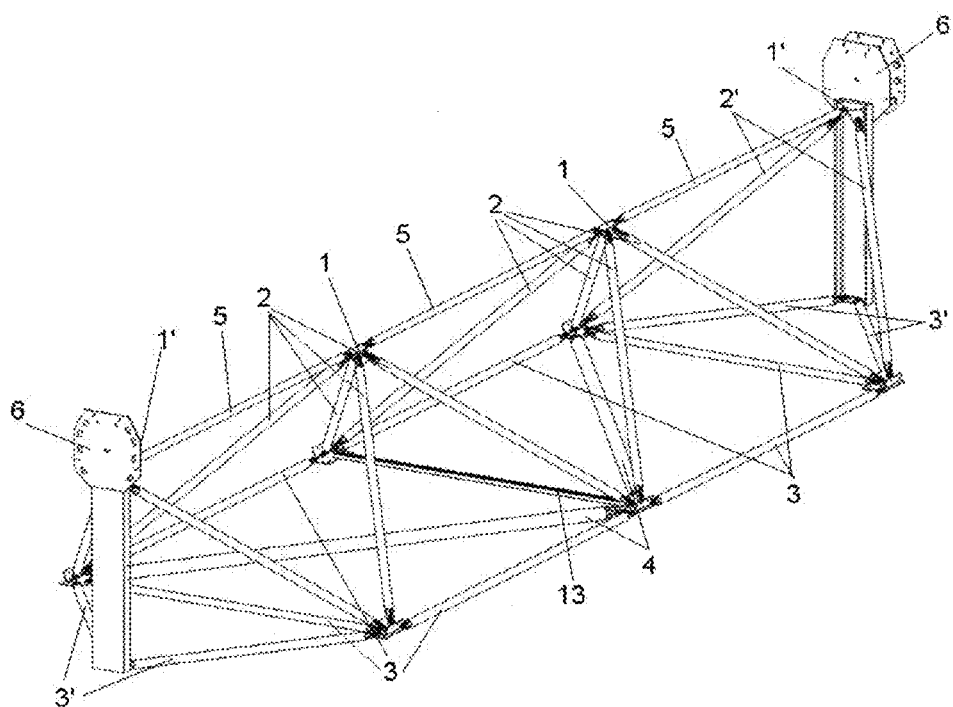
FIG. 2: Structural elements. Perspective

FIG. 2 shows in detail the structural elements of the module. The triangular substructure is formed by regular pyramids that have an upper vertex (1) where the four sides or diagonal edges (2) meet. These edges (2) are joined on the other end to the sides (3, 13) forming the rectangular base of the pyramid. In the base of the pyramids, a bar (4) connects two of the opposite vertices of said base. This bar (4) has a greater diameter since it is the bar of the structure that supports the greatest load. Also represented is the bar of the base that is common to both pyramids (13), which is a secondary element of the main structure that supports a lower load but limits the buckling length of the lower chords. This is the reason why it is carried out in an open C-shaped section profile instead of being carried out with circular or square section tubes, like all the elements that comprise the triangular substructure.

The half-pyramids or tetrahedrons located on the ends of the structure comprise a vertex (1') and two diagonal bars (2') such as edges that are connected on the lower ends to the sides (3') forming the triangular base.

Three adjoining bars (5) connect the upper vertices of the half-pyramids (1') and the pyramids (1) between them to achieve an optimum transmission and load distribution.

On the ends of the module, two king posts (6) are installed, responsible for transmitting the torsion coming from the adjacent module to the triangular substructure.

The following are connected to these:
the diagonal edges of the two tetrahedrons or half-pyramids (2') of the triangular substructure,
the edges of the triangular base of the half-pyramid (3'),
the individual bars (5) that join the upper vertices (1) of the end pyramids with those of the half-pyramids (1'),
the central axis (not shown), on one of the two ends, which coincides with the center of gravity of the structure (calculated including the reflector and the absorber tube).

Figure 3:
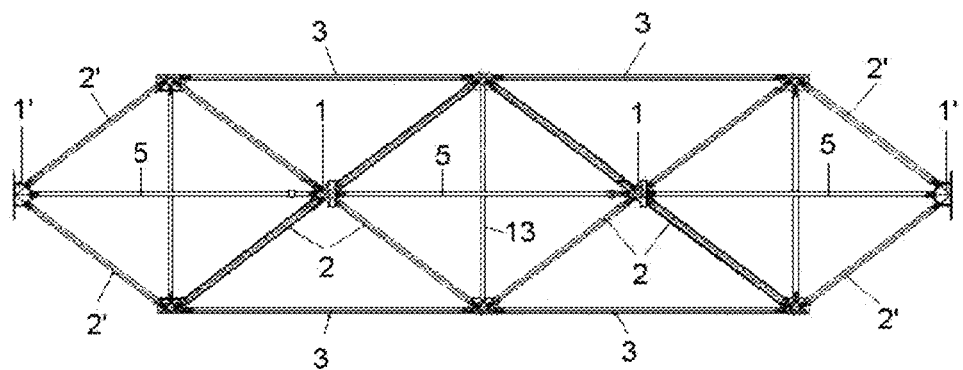
FIG. 3: Structural elements. Plan

FIG. 3 shows a plan view of the structural elements.

Figure 4:
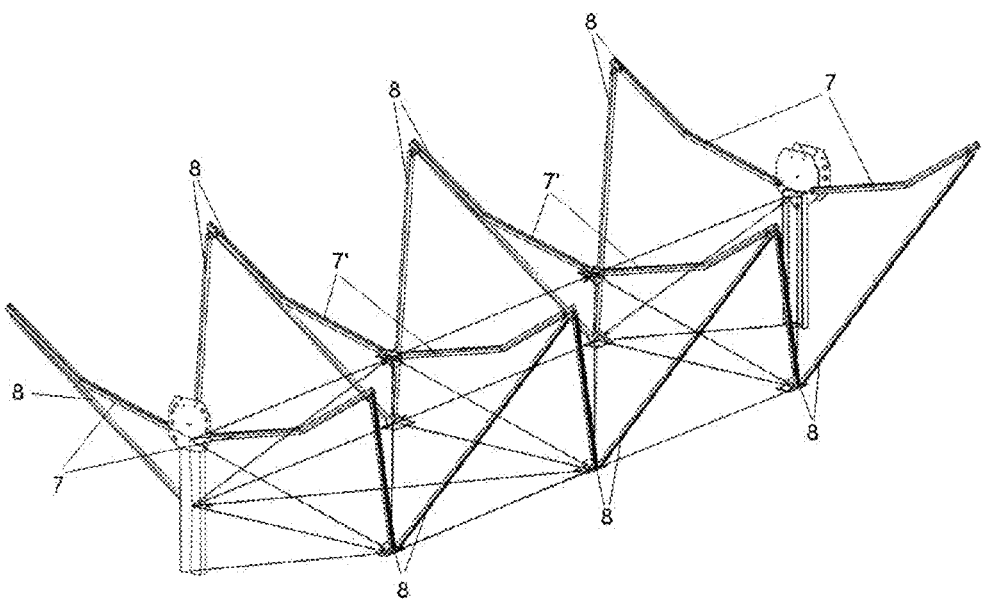
FIG. 4: Supplementary elements: "V1" configuration

FIG. 4 shows the embodiments according to the V1 arrangement. It reflects a part of the supplementary elements. Specifically, in this figure, the following is shown:
The arms (7, 7'): are connected to the triangular substructure and have the following characteristics:
Arms with a bending point which allows adapting the curvature to that of the mirrors parabola,
Inner arms (7') starting from the vertices of the pyramids (1),
Two outer arms (7) starting from the vertices of the half-pyramids (1') by means of plates associated to with the king post (6).
Support element (8) of the ends of each arm (7, 7'): they only support the proportional weight of the mirror that is on top of them, but they do not support any torsional moment; there is a number of alternative embodiments for these support elements and FIG. 4 shows the embodiment of the so-called "V1" configuration. In this embodiment, the struts consist of two inclined bars (8), connecting the lower vertex of the corresponding pyramid to the ends of the two adjacent arms (7, 7'). The assembly of these two struts that are connected to the same vertex simulates a "V" shape.

Figure 5:
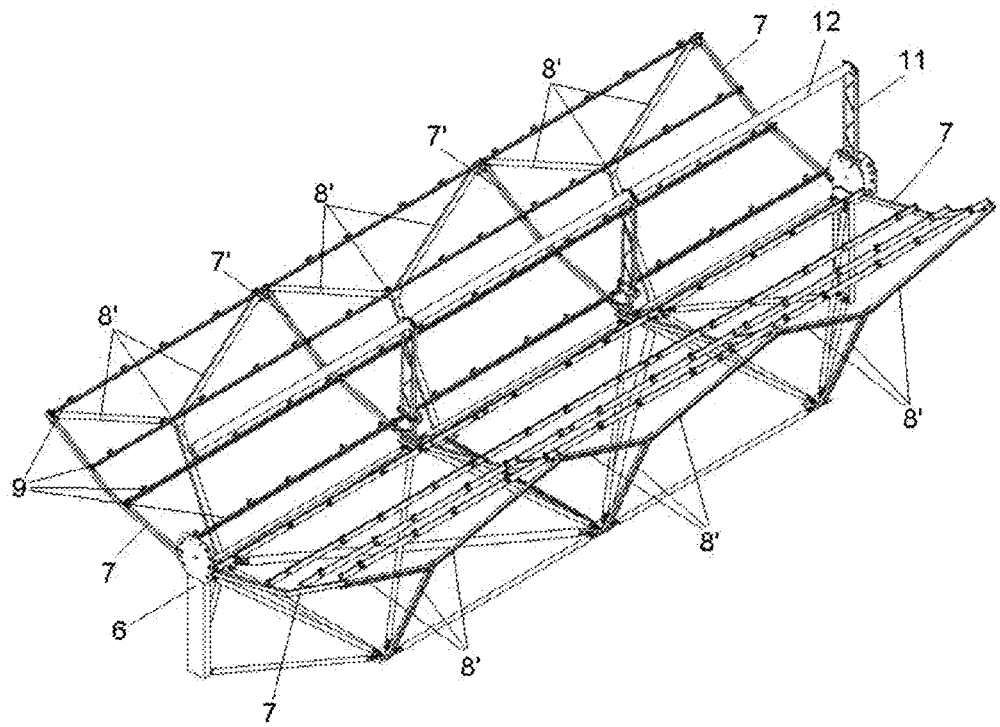
FIG. 5: "Y1" configuration

FIG. 5 shows the complete module according to the arrangement of the struts in Y1 (8'). This configuration consists in a bar connected to the end of each arm (7, 7') and that is connected, at the midpoint between the arms and at an intermediate height, to the bar that comes out from the end of the adjacent arm; a single bar that comes out already from the connection point between both bars, joins them to the vertex of the base of the corresponding pyramid. The assembly of the three bars simulates a "Y" shape (8').

Purlins (9): with a length equal to the length of the module, they rest directly on the arms (7, 7') and the mirrors are assembled on them by means of staples (10).
Supports (11) of the absorber tube (12): two supports are attached to the vertices of the pyramids (1) and in addition, there is another support attached to the king post (6).

Figure 6:
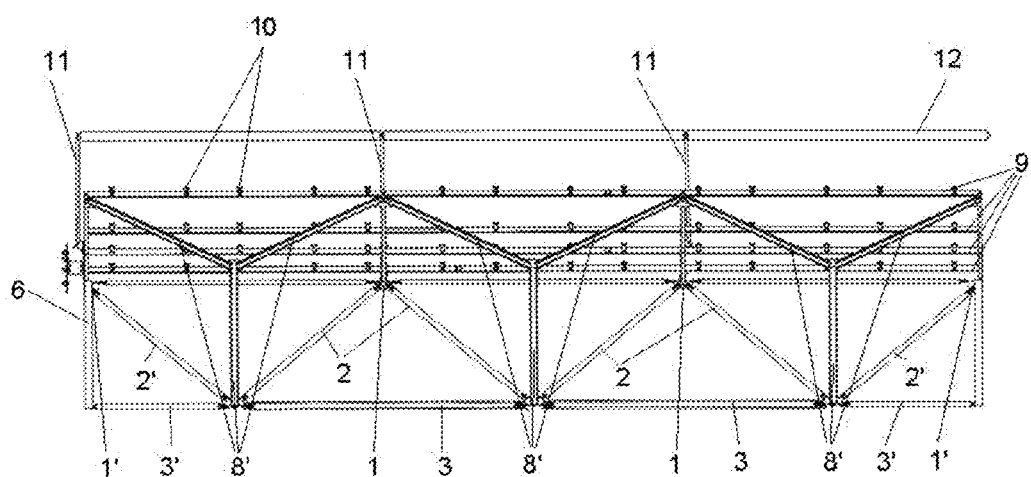
FIG. 6: "Y1" lateral configuration

FIG. 6 shows a side view of the perspective shown in FIG. 5. The "Y1" configuration of the supports (8') of the ends of the arms (7, 7') is clearly distinguished.

Figure 7:
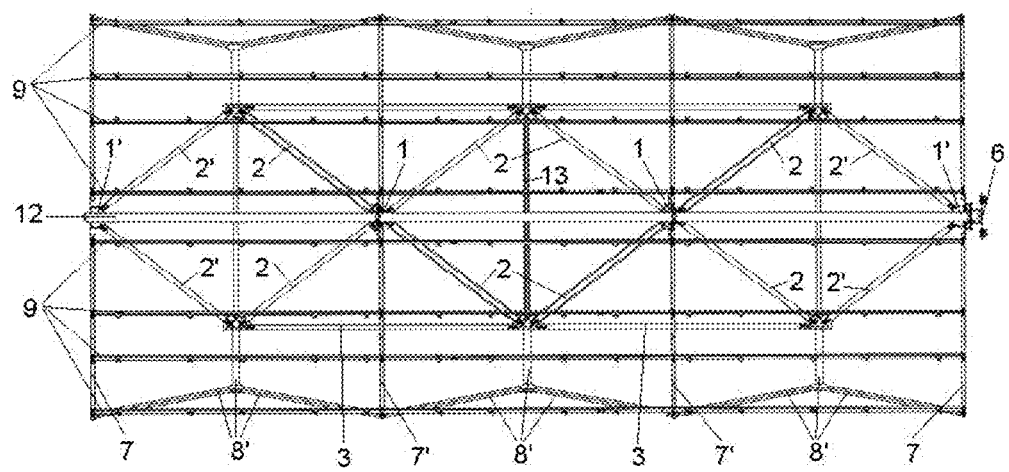
FIG. 7: Plan view. Complete module "Y1" configuration

FIG. 7 is a plan view of the previous embodiment.

Figure 8:
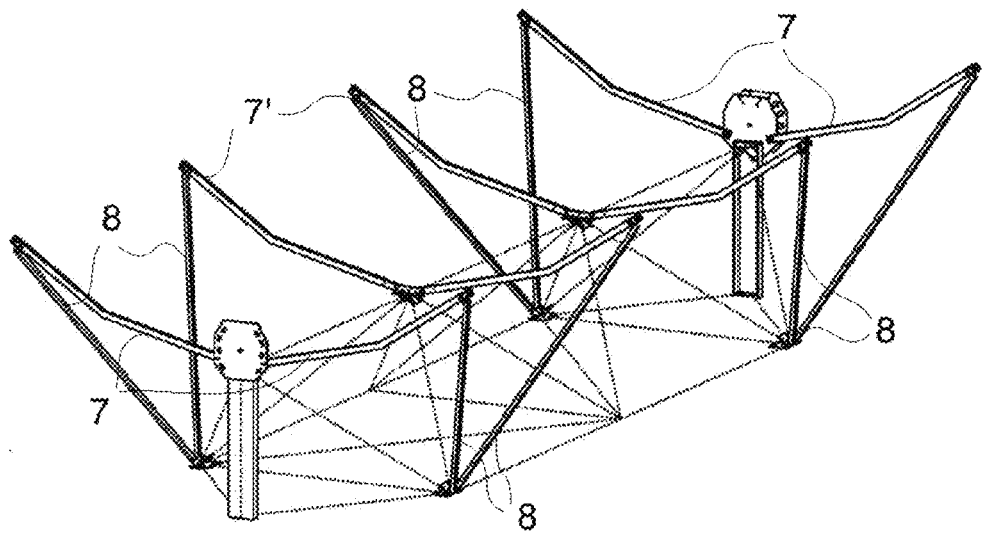
FIG. 8: Supplementary elements: "V2" configuration

FIG. 8 shows a configuration of the module with the struts according to "V2". This configuration is identical to that of "V1", except that the alternate vertices are provided with struts (8), keeping also those located on the ends of the module.

Figure 9:
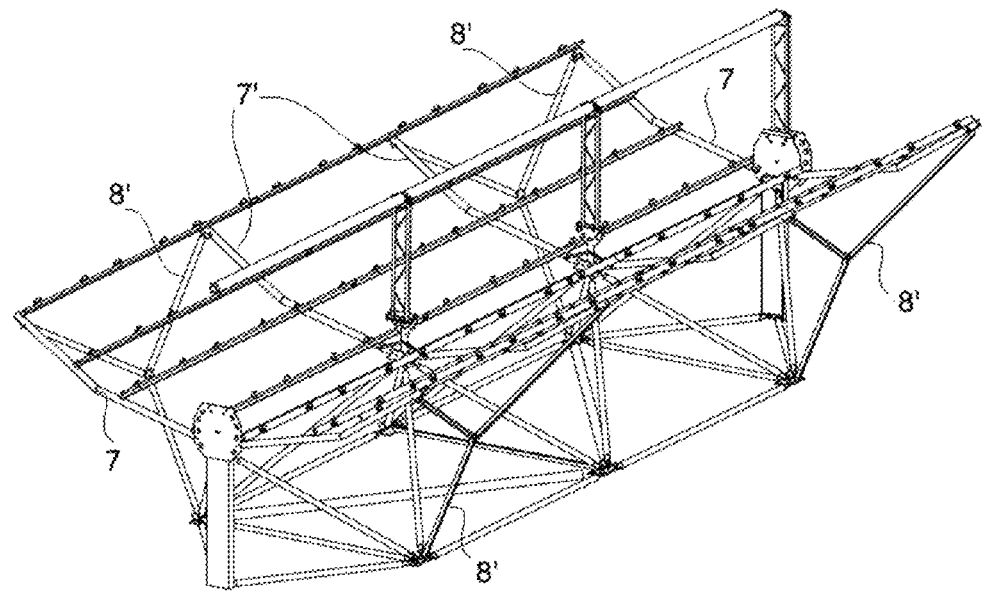
FIG. 9: Complete module "Y2" configuration

FIG. 9 shows the configuration of the module with the struts according to "Y2". In this configuration, the alternate vertices are provided with struts (8'), keeping also those located on the ends of the module.

Figure 10:
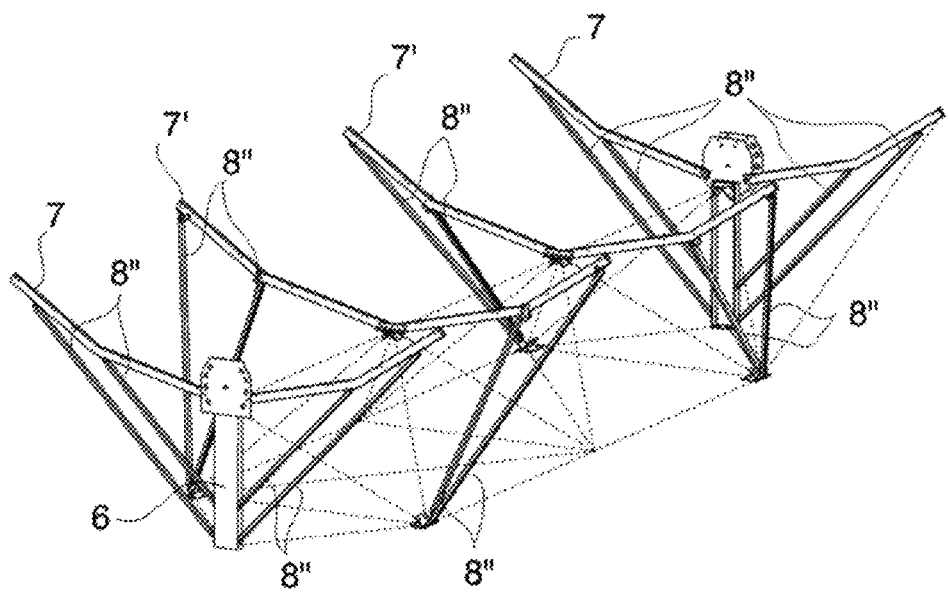
FIG. 10: Supplementary elements: embodiment 3

FIG. 10 shows the supplementary elements according to embodiment 3. In this embodiment, there are two struts (8") for the two end arms (7, the outer arms). A strut (8") spans from the lower end of the king post (6) to the end of the arm (7), the other runs in parallel and is attached slightly higher to the king post (6) and to the bending point of the arm (7). In the case of the inner arms (7'), there are also two struts (8") starting from the lower vertex, which is the joining node between the half-pyramid and the first pyramid, the first strut (8″) spanning from the vertex to the upper end of the arm (7′) and the other strut (8″) from the same vertex to the bending point in the arm (7′).

The structure or collector module described is specially designed for its application in cylindrical-parabolic collectors, but its extension to other fields of the industry requiring similar characteristics is not ruled out.

The invention claimed is:

1. Support module for a solar collector with triangular substructure, having a single lower surface and one upper line, forming a triangular substructure for resisting loads, which comprises a number of structural members or main structure intended to resist the torsional and bending forces of the collector as well as all the loads of the module, and a number of supplementary elements or auxiliary structure, the purpose of which is to balance the module and support the weight of the reflector and of the absorber tube characterized in that the main structure comprises:

Triangular substructure or triangular prism: it transmits the torsion along the module and comprises:
- a single row of regular rectangular base pyramids, located one after the other, each one of the pyramids having an upper vertex (1), four edges (2) which are the diagonal edges connecting the upper vertex (1) of the pyramid to the lower vertices of the base of the pyramid and three edges (3-13) forming the base;
- two tetrahedrons or half-pyramids located one on each end of the triangular substructure and formed by an upper vertex (1′), two edges (2′) connecting the upper vertex (1′) to the lower vertices of the base of the half-pyramid and the edges (3′) forming the base of the half-pyramid;
- individual bars (5) joining the upper vertex of each pyramid (1) to the upper vertex (1) of the adjacent pyramid or to the upper vertex (1′) of the adjacent half-pyramid (1′),
- diagonal bar (4) joining two opposite vertices of the base of each pyramid;

Two king posts (6): located one on each end of the triangular substructure, formed by a vertical piece with standardized profile that transmits the torsion that comes from the adjacent module to the triangular substructure and where the following is connected:
- the diagonal edges (2′) of the two tetrahedrons or half-pyramids of the triangular substructure,
- the edges (3′) of the triangular base of the half-pyramid,
- the individual bars (5) joining the upper vertices of the end pyramids (1) to those of the half-pyramids (1′),
- the central axis, on one of the two ends, which coincides with the center of gravity of the structure including the reflector and the absorber tube, and the auxiliary structure or the supplementary elements comprise:
- arms (7, 7′): formed by a rectangular-section bent tube or by a rectangular-section curved tube, which can be adapted to the curvature of the parabola of the reflector, having inner arms (7′) joining the upper vertices (1) of the pyramids and two outer arms (7) joining the upper vertices (1′) of the half-pyramids by means of plates associated to the king posts (6),
- struts or supporting elements (8, 8′ 8″) from each arm (7, 7′) to the lower vertices of the pyramids or to the king posts,
- purlins (9): of the same length as the length of the module, they rest directly on the arms (7, 7′) and the reflector is assembled on them by means of staples (10),
- supports (11) for the absorber tube (12): vertical structures attached to each one of the upper vertices of the pyramids (1) and to one of the two king posts (6), where two struts (8) come out from each lower vertex of the pyramid and are connected to the end of each one of the two adjacent arms, simulating a "V" shape or where the struts (8′) connect two adjoining arms (7, 7′) to the lower vertex of the corresponding pyramid, simulating a "Y" shape or where two struts (8″) come out from each arm (7, 7′), each struts coming from a different point on said arm.

2. Support module for a solar collector with triangular substructure according to claim 1, characterized in that the "Y" configuration comprises a bar connected on the end of each arm and that joins at the midpoint between the arms and at an intermediate height with the bar that comes out from the end of the adjacent arm; a single bar that comes out of the connection point between both bars, joins them to the vertex of the base of the corresponding pyramid.

3. Support module for a solar collector with triangular substructure according to claim 1 characterized in that all the lower vertices have struts.

4. Support module for a solar collector with triangular substructure according to claim 1 characterized in that the alternate vertices are provided with struts, keeping those located on the end vertices also provided with struts.

5. Support module for a solar collector with triangular substructure according to claim 1 characterized in that there are two struts for the two end arms (outer arms) where a strut spans from the lower end of the king post to the end of the arm and the other strut runs in parallel and is attached slightly higher on the king post spanning to the bending point in the arm; on the inner arms, there are also two struts starting from the lower vertex which is the joining node between the half-pyramid and the first pyramid, the first strut spanning from the vertex to the upper end of the arm and the other strut spanning from the same vertex to the bending point in the arm.

6. Support module for a solar collector with triangular substructure according to claim 1 characterized in that the absorber tube supports have a freedom of rotation in the longitudinal direction of the collector, transversal bending rigidity and a minimum opacity structure to avoid producing shadows on the surface of the mirrors.

7. Support module for a solar collector with triangular substructure according to claim 1 characterized in that the profiles used in the design of the triangular substructure (2, 2′, 3, 3′, 4) and the individual bars (5) joining the vertices of the pyramids (1) and half-pyramids (1′) are circular or square section tubes.

8. Support module for a solar collector with triangular substructure according to claim 1 characterized in that if the configuration is V-shaped, the arms are manufactured with rectangular section or open C-shaped section profile tubes.

9. Support module for a solar collector with triangular substructure according to claim 1 characterized in that if the configuration is V-shaped, the purlins, the struts and the strengthening edge (13) or edge of the base of the pyramids that adjacent pyramids have in common, is manufactured based on open C-shaped section or omega (W) profiles.

10. Support module for a solar collector with triangular substructure according to claim 1, characterized in that the material used for all the structural elements will be hot galvanized S275 or S355 steel.

* * * * *